United States Patent
Xu et al.

(10) Patent No.: US 11,685,461 B2
(45) Date of Patent: Jun. 27, 2023

(54) SCOOTER FOLDING MECHANISM

(71) Applicant: Zhejiang Jinbang Sports Equipment Co., Ltd., Zhejiang (CN)

(72) Inventors: Yongqiang Xu, Zhejiang (CN); Yuancheng Liu, Zhejiang (CN); Yong Qian, Zhejiang (CN)

(73) Assignee: Zhejiang Jinbang Sports Equipment Co., Ltd., Zhejiang (CN)

( * ) Notice: Subject to any disclaimer, the term of this patent is extended or adjusted under 35 U.S.C. 154(b) by 276 days.

(21) Appl. No.: 17/294,423

(22) PCT Filed: Jun. 18, 2020

(86) PCT No.: PCT/CN2020/096720
§ 371 (c)(1),
(2) Date: May 17, 2021

(87) PCT Pub. No.: WO2020/253759
PCT Pub. Date: Dec. 24, 2020

(65) Prior Publication Data
US 2021/0403118 A1  Dec. 30, 2021

(30) Foreign Application Priority Data
Jun. 19, 2019 (CN) .......................... 201920931115.0

(51) Int. Cl.
*B62K 15/00* (2006.01)
*B62K 3/00* (2006.01)

(52) U.S. Cl.
CPC ............ *B62K 15/006* (2013.01); *B62K 3/002* (2013.01)

(58) Field of Classification Search
CPC .............................. B62K 3/002; B62K 15/006
See application file for complete search history.

(56) References Cited

U.S. PATENT DOCUMENTS 6,343,798 B1 * 2/2002 Chen ................... B62K 15/006
280/87.05
10,407,119 B1 * 9/2019 Greenberg ........... B62K 15/006
(Continued)

FOREIGN PATENT DOCUMENTS

CN          201457624 U  *  5/2010
CN          204432871       7/2015
(Continued)

OTHER PUBLICATIONS

"International Search Report (Form PCT/ISA/210) of PCT/CN2020/096720," dated Sep. 11, 2020, with English translation thereof, pp. 1-4.

*Primary Examiner* — Katy M Ebner
(74) *Attorney, Agent, or Firm* — JCIP Global Inc.

(57) ABSTRACT

A scooter folding mechanism includes a bottom plate, an inclined rod, a limiting mechanism, a double-lock catch, a limiting plate rotatably arranged on the bottom plate, and a pedal rotatably arranged on the limiting plate. The inclined rod is rotatably arranged on the bottom plate. The limiting mechanism includes unfolding and folding clamping slots arranged on the inclined rod, a limiting piece and a return spring arranged on the limiting plate and matched with the unfolding or folding clamping slots. The return spring is configured to drive the limiting piece to engage with the unfolding or folding clamping slots. The unfolding and folding clamping slots are distributed circumferentially around a first shaft rod. The double-lock catch includes a double-lock block rotatably arranged on the inclined rod and a double-clamping groove arranged on the pedal and matched with the double-lock block.

18 Claims, 3 Drawing Sheets

(56) References Cited

U.S. PATENT DOCUMENTS

| | | | |
|---|---|---|---|
| 11,364,967 B1* | 6/2022 | Owen | B62K 3/002 |
| 11,414,154 B2* | 8/2022 | Mazoyer | B62K 3/002 |
| 2006/0237934 A1 | 10/2006 | Tsai | |
| 2009/0230648 A1* | 9/2009 | Chan | B62K 3/002 |
| | | | 280/87.041 |
| 2011/0031710 A1* | 2/2011 | Lin | B62K 3/002 |
| | | | 280/87.05 |
| 2018/0186424 A1* | 7/2018 | Sung | B62K 3/002 |

FOREIGN PATENT DOCUMENTS

| | | | |
|---|---|---|---|
| CN | 206968898 | | 2/2018 |
| CN | 207631416 U | * | 7/2018 |
| CN | 208576679 | | 3/2019 |
| CN | 209833878 | | 12/2019 |
| CN | 210338174 | | 4/2020 |

* cited by examiner

SCOOTER FOLDING MECHANISM

CROSS-REFERENCE TO RELATED APPLICATION

This application is a 371 of international application of PCT application serial no. PCT/CN2020/096720, filed on Jun. 18, 2020, which claims the priority benefit of China application no. 201920931115.0, filed on Jun. 19, 2019. The entirety of each of the above mentioned patent applications is hereby incorporated by reference herein and made a part of this specification.

BACKGROUND

Technical Field

The present invention relates to the field of scooters, and more particularly relates to a scooter folding mechanism.

Description of Related Art

As travel tools for a short-distance journey, scooters are getting more and more attention and welcome from people due to their energy saving, environmental protection and convenient operation. In order to facilitate the storage and transportation of scooters, foldable scooters came into being. The current scooter folding structures of the foldable scooters generally have complex structures, high fabricating costs, and inconvenient folding operations.

SUMMARY

The objective of the present invention is to provide a scooter folding mechanism, which is not only simple in structure, capable of reducing production costs, but also convenient in folding operation, and safe and reliable in use.

The technical solution of the present invention is as follow.

A scooter folding mechanism includes a bottom plate and an inclined rod for installing a vertical rod. The inclined rod is rotatably arranged on the bottom plate through a first shaft rod. The scooter folding mechanism further includes limiting mechanism, a double-lock catch, a limiting plate rotatably arranged on the bottom plate through a second shaft rod, and a pedal rotatably arranged on the limiting plate through a third shaft rod. The limiting mechanism includes an unfolding clamping slot and a folding clamping slot, which are arranged on the inclined rod, a limiting piece and a return spring, which are arranged on the limiting plate and configured to be matched with the unfolding clamping slot or the folding clamping slot. The return spring is configured to drive the limiting piece to be engaged with the unfolding clamping slot or the folding clamping slot. The unfolding clamping slot and the folding clamping slot are distributed circumferentially around the first shaft rod. The double-lock catch comprises a double-lock block rotatably arranged on the inclined rod and a clamping groove arranged on the pedal and configured to be matched with the double-lock block.

The unfolding operation of the scooter folding mechanism is as follows. The pedal is pressed downward (in practice, the pedal may be pressed downward by foot) so as to drive the limiting plate to rotate downward around the second shaft rod, so that the limiting piece is separated from the folding clamping slot. Then, the inclined rod is rotated toward the front portion of the scooter, and in this process, when the limiting piece is aligned with the unfolding clamping slot, the limiting piece is engaged with the unfolding clamping slot under the action of the return spring. At this moment, the inclined rod and the frame plate are in an unfolded state, that is, the scooter using the scooter folding mechanism is in the unfolded state. Then, the pedal is rotated around the third shaft rod toward the inclined rod, so that the double-lock block is engaged with the double-clamping groove to form a function of double-lock catch, so as to ensure the stability of the inclined rod and the frame plate in the unfolded state, thereby improving the use safety of the scooter when the scooter is in the unfolded state, so as to ensure that the scooter runs safely and has the characteristics of safe and reliable use.

The folding operation of the scooter folding mechanism is as follows. The pedal rotates downward around the third shaft rod to separate the double-lock block from the double-clamping groove, and then the pedal continues to be pressed downward to drive the limiting plate to rotate downward around the second shaft rod, so that the limiting piece is separated from the unfolding clamping slot. Then, the inclined rod is rotated toward the rear portion of the scooter, and in this process, when the limiting piece is aligned with the folding clamping slot, the limiting piece is engaged with the folding clamping slot under the action of the return spring. At this moment, the inclined rod and the frame plate are in a folded state, that is, the scooter using the scooter folding mechanism is in the folded state, thereby reducing the volume of the scooter and facilitating storage and transportation. The scooter folding mechanism of the present solution is not only simple in structure, capable of reducing production costs, but also convenient in folding operation, and safe and reliable in use.

Preferably, when the limiting piece is engaged with the unfolding clamping slot, the inclined rod and the bottom plate are in the unfolded state. When the limiting piece is engaged with the folding clamping slot, the inclined rod and the bottom plate are in the folded state. After the limiting piece is engaged with the unfolding clamping slot, the pedal is rotated around the third shaft rod toward the inclined rod, so that the double-lock block is engaged with the double-clamping groove.

Preferably, the limiting plate is provided with a jacking mechanism. The jacking mechanism comprises an installation hole arranged on the limiting plate, an ejector rod slidably arranged in the installation hole and a compression spring arranged on the installation hole. The compression spring is located between a bottom surface of the installation hole and the ejector rod, so that an end portion of the ejector rod abuts against the pedal. In this way, after the double-lock block is engaged with the double-clamping groove, the end portion of the ejector rod abuts against the pedal under an action of the compression spring, so that the pedal abuts against the inclined rod, thereby enabling the state, in which the double-lock block is engaged with the double-clamping groove, to be stable, and thereby avoiding the separation of the double-lock block and the double-clamping groove due to the vibration of the scooter body during the use of the scooter, and ensuring the stability of the function of the double-lock catch, so as to ensure that the scooter runs safely.

Preferably, after the double-lock block is engaged with the double-clamping groove, the end portion of the ejector rod abuts against the pedal under an action of the compression spring, so that the pedal abuts against the inclined rod.

Preferably, the pedal is provided with a limiting protruding block for matching with the limiting plate. When the limiting protruding block abuts against the limiting plate, the limiting protruding block is configured to prevent the pedal from rotating downward around the third shaft rod. In this way, after the limiting protruding block abuts against the limiting plate, the limiting plate is driven to rotate downward around the second shaft rod by pressing the pedal downward, so that the limiting piece is separated from the folding clamping slot or the unfolding clamping slot.

Preferably, one end of the return spring is connected to the inclined rod or the first shaft rod, and the other end of the return spring is connected to the limiting plate or the limiting piece.

Preferably, the second shaft rod is close to a front end of the bottom plate, and at least a part of the pedal is located between the inclined rod and a rear end of the bottom plate. In this way, it is convenient for a user to press the pedal downward by foot.

Preferably, the limiting plate is V-shaped, and the inclined rod is located above the limiting plate.

Preferably, the limiting piece is a limiting rod, and the limiting rod is parallel to the first shaft rod.

Preferably, an upper surface of the bottom plate is provided with a vertical plate, and the first shaft rod is arranged on the vertical plate. In this way, it is convenient for the actual installation of the inclined rod.

The beneficial effect of the present invention is as follows. The present invention not only has a simple structure, can reduce production costs, but also has the characteristics of convenient folding operation and safe and reliable use.

DESCRIPTION OF THE EMBODIMENTS

Figure 1:
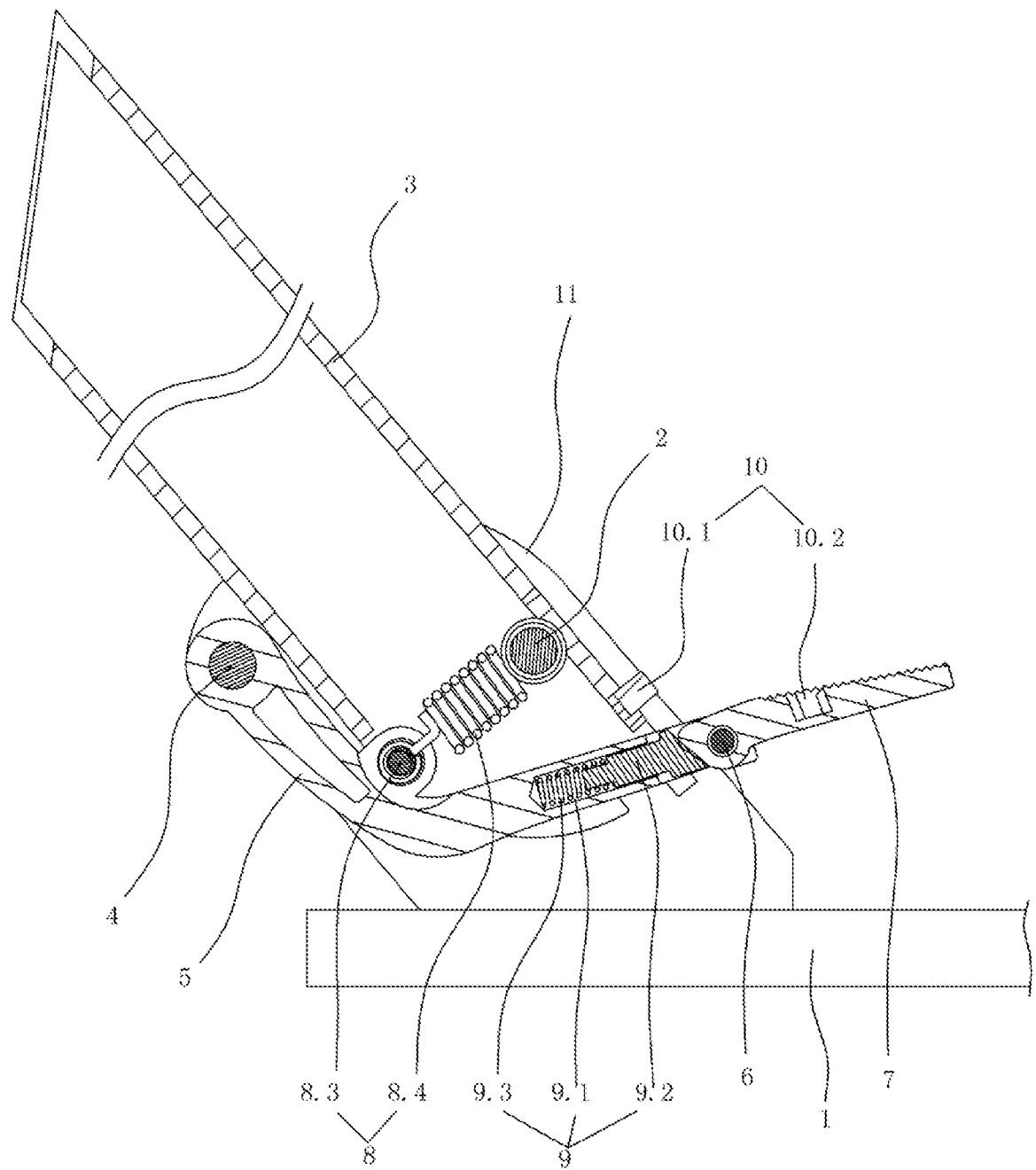
FIG. 1 is a schematic diagram of a partial structure of a scooter folding mechanism in an unfolded state according to the present invention.

In order to make the objectives, technical solutions and advantages of the embodiments of the technical solutions of the present invention clearer, clear explanations and descriptions will be made below to the technical solutions of the embodiments of the present invention in conjunction with the accompanying drawings. However, the following embodiments are only preferred embodiments of the present invention, rather than all of the embodiments. Based on the embodiments in the implementation modes, other embodiments obtained by those skilled in the art without making creative work shall fall into the protection scope of the present invention.

Embodiments of the present invention are described in detail below, and examples of the embodiments are illustrated in the accompanying drawings, wherein the same or similar numbers from the beginning to the end denote the same or similar elements or the elements having the same or similar functions. The embodiments described below with reference to the accompanying drawings are exemplary, and are only used to explain the present solution, rather than being construed as limitations on the solution of the present invention.

These and other aspects of the embodiments of the present invention will be clear with reference to the following descriptions and accompanying drawings. In these descriptions and accompanying drawings, some specific implementation modes in the embodiments of the present invention are specifically disclosed to represent some ways of implementing the principles of the embodiments of the present invention, but it should be understood that the scope of the embodiments of the present invention is not limited thereto. On the contrary, the embodiments of the present invention include all changes, modifications, and equivalents falling within the spirit and connotation scope of the appended claims.

In the description of the present invention, it should be understood that, the orientations or positional relationships indicated by the terms "thickness", "upper", "lower", "horizontal", "top", "bottom", "inner", "outer", "circumferential" and the like, are the orientations or positional relationships shown based on the accompanying drawings, and are only intended to facilitate the description of the present invention and the simplification of the description, rather than to indicate or imply that the indicated device or element must have a specific orientation, and must be constructed and operated in a specific orientation, and therefore cannot be construed as a limitation on the present invention. In the descriptions of the present invention, the meaning of "a plurality of" is at least two, e.g., two and three. Unless otherwise clearly and specifically specified, the meaning of "several" represents one or more.

In the present invention, unless otherwise clearly specified and limited, the terms "installation", "linking", "connection", "secure" and the like should be understood in a broad sense. For example, the connection may be a fixed connection, a detachable connection or an integrated connection, may be a mechanical connection, an electrical connection or in communication with one another, and may be a direct connection, an indirect connection through an intermediate medium, internal communication of two components or an interaction relationship between two elements Those of ordinary skill in the art could understand the specific meanings of the above terms in the present invention according to specific situations.

Figure 2:
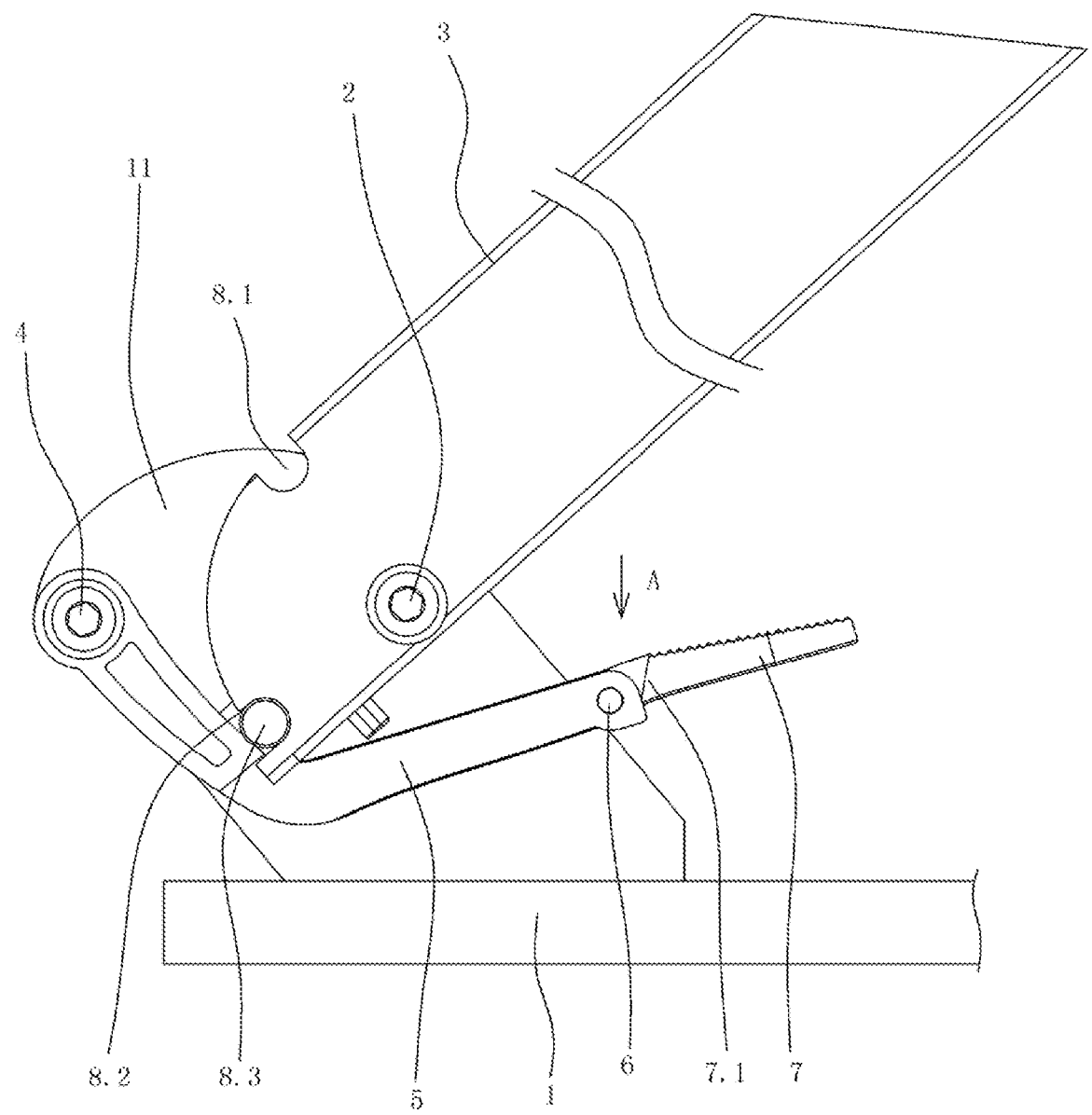
FIG. 2 is a schematic diagram of a partial structure of the scooter folding mechanism in a folded state according to the present invention.

First embodiment. As shown in FIG. 1 and FIG. 2, a scooter folding mechanism includes a bottom plate 1 and an inclined rod 3 for installing a vertical rod. The scooter folding mechanism further includes a limiting mechanism 8, a double-lock catch 10, a limiting plate 5 rotatably arranged on the bottom plate 1 through a second shaft rod 4, and a pedal 7 rotatably arranged on the limiting plate 5 through a third shaft rod 6. The inclined rod 3 is rotatably arranged on the bottom plate 1 through a first shaft rod 2. The limiting mechanism 8 includes an unfolding clamping slot 8.1 and a folding clamping slot 8.2, which are arranged on the inclined rod 3, a limiting piece 8.3 and a return spring 8.4, which are arranged on the limiting plate 5 and are configured to be matched with the unfolding clamping slot 8.1 or the folding clamping slot 8.2. The return spring 8.4 is configured to drive the limiting piece 8.3 to be engaged with the unfolding clamping slot 8.1 or the folding clamping slot 8.2. The unfolding clamping slot 8.1 and the folding clamping slot 8.2 are distributed circumferentially around the first shaft rod 2. The double-lock catch 10 includes a double-lock block 10.1 rotatably arranged on the inclined rod 3 and a double-clamping groove 10.2 arranged on the pedal and configured to be matched with the double-lock block 10.1.

The unfolding operation of the scooter folding mechanism is as follows. As shown in FIG. 1, the pedal 7 is pressed downward (in practice, the pedal may be pressed downward by foot) so as to drive the limiting plate 5 to rotate downward around the second shaft rod 4 so that the limiting piece 8.3 is separated from the folding clamping slot 8.2. Then, the inclined rod 3 is rotated toward the front portion of the scooter, and in this process, when the limiting piece 8.3 is aligned with the unfolding clamping slot 8.1, the limiting piece 8.3 is engaged with the unfolding clamping slot 8.1 under the action of the return spring 8.4. At this moment, the inclined rod 3 and the frame plate are in an unfolded state, that is, the scooter using the scooter folding mechanism is in the unfolded state. Then, the pedal 7 is rotated around the third shaft rod 6 toward the inclined rod 3 so that the double-lock block 10.1 is engaged with the double-clamping groove 10.2 to form a function of double-lock catch 10, so as to ensure the stability of the inclined rod 3 and the frame plate in the unfolded state, thereby improving the use safety of the scooter when the scooter is in the unfolded state, so as to ensure that the scooter runs safely and has the characteristics of safe and reliable use.

The folding operation of the scooter folding mechanism is as follows. As shown in FIG. 2, the pedal 7 rotates downward around the third shaft rod 6 to separate the double-lock block 10.1 from the double-clamping groove 10.2, and then the pedal 7 continues to be pressed downward to drive the limiting plate 5 to rotate downward around the second shaft rod 4 so that the limiting piece 8.3 is separated from the unfolding clamping slot 8.1. Then, the inclined rod 3 is rotated toward the rear portion of the scooter, and in this process, when the limiting piece 8.3 is aligned with the folding clamping slot 8.2, the limiting piece 8.3 is engaged with the folding clamping slot 8.2 under the action of the return spring 8.4. At this moment, the inclined rod 3 and the frame plate are in a folded state, that is, the scooter using the scooter folding mechanism is in the folded state, thereby reducing the volume of the scooter and facilitating storage and transportation. The scooter folding mechanism of the present solution is not only simple in structure, capable of reducing production costs, but also convenient in folding operation, and safe and reliable in use.

The scooter, to which the scooter folding device of the present embodiment is applied, includes a vertical rod, and the vertical rod is installed on the inclined rod. A bottom portion of the vertical rod is provided with a front wheel, and a top portion of the vertical pole is installed with a handle. A rear wheel is installed below the rear portion of the bottom plate.

As shown in FIG. 1, when the limiting piece 8.3 is engaged with the unfolding clamping slot 8.1, the inclined rod 3 and the bottom plate 1 are in the unfolded state. As shown in FIG. 2, when the limiting piece 8.3 is engaged with the folding clamping slot 8.2, the inclined rod and the bottom plate are in the folded state. After the limiting piece 8.3 is engaged with the unfolding clamping slot 8.1, the pedal 7 is rotated around the third shaft rod 6 toward the inclined rod 3 so that the double-lock block 10.1 is engaged with the double-clamping groove 10.2.

As shown in FIG. 2, a lower end of the inclined rod 3 has an arc surface, and an axis of the arc surface is coaxial with the first shaft rod 2. The unfolding clamping slot 8.1 and the folding clamping slot 8.2 are arranged in the arc surface.

Figure 3:
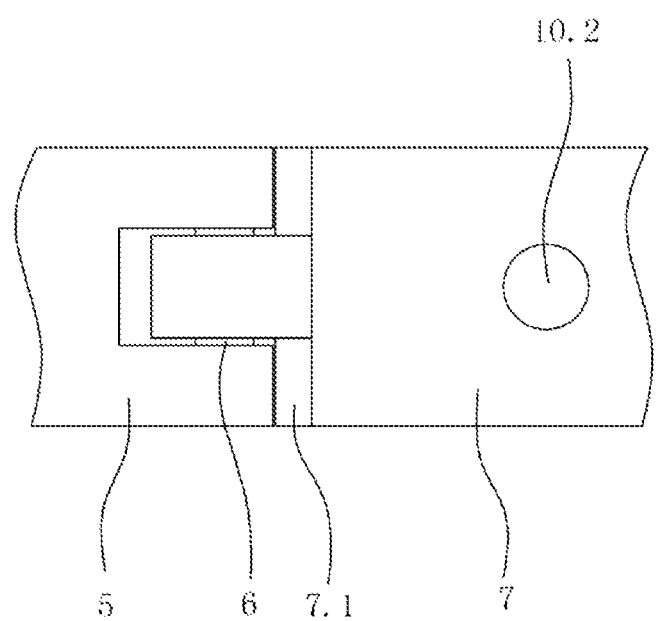
FIG. 3 is a schematic diagram of a partial structure in direction A in FIG. 2.

As shown in FIG. 2 and FIG. 3, the pedal 7 is provided with a limiting protruding block 7.1 for matching with the limiting plate 5. In the present embodiment, the limiting protruding block 7.1 is arranged on a side surface of the pedal 7 facing the limiting plate 5. When the limiting protruding block 7.1 abuts against the limiting plate 5, the limiting protruding block 7.1 is used to prevent the pedal 7 from rotating downward around the third shaft rod 6. Specifically, the pedal 7 rotates downward around the third shaft rod 6 until the limiting protruding block 7.1 abuts against the limiting plate 5. At this moment, the limiting protruding block 7.1 is used to prevent the pedal 7 from rotating downward around the third shaft rod 6. In this way, after the limiting protruding block 7.1 abuts against the limiting plate 5 the limiting plate 5 is driven to rotate downward around the second shaft rod 4 by pressing the pedal 7 downward, so that the limiting piece 8.3 is separated from the folding clamping slot 8.2 or the unfolding clamping slot 8.1.

Further, as shown in FIG. 1, the limiting plate is provided with a jacking mechanism 9. The jacking mechanism includes an installation hole 9.1 arranged on the limiting plate, an ejector rod 9.2 slidably arranged in the installation hole 9.1 and a compression spring 9.3 arranged on the installation hole 9.1. The compression spring 9.3 is located between a bottom surface of the installation hole 9.1 and the ejector rod 9.2, so that an end portion of the ejector rod 9.2 abuts against the pedal 7. After the double-lock block 10.1 is engaged with the double-clamping groove 10.2, the end portion of the ejector rod 9.2 abuts against the pedal 7 under an action of the compression spring 9.3, so that the pedal 7 abuts against the inclined rod 3. In this way, after the double-lock block 10.1 is engaged with the double-clamping groove 10.2, the end portion of the ejector rod 9.2 abuts against the pedal 7 under an action of the compression spring 9.3, so that the pedal 7 abuts against the inclined rod 3, thereby enabling the state, in which the double-lock block 10.1 is engaged with the double-clamping groove 10.2, to be stable, and avoiding the separation of the double-lock block 10.1 and the double-clamping groove 10.2 due to the vibration of the scooter body during the use of the scooter, and thereby ensuring the stability of the function of the double-lock catch 10, so as to ensure that the scooter runs safely.

Further, one end of the return spring 8.4 is connected to the inclined rod or the first shaft rod, and the other end of the return spring is connected to the limiting plate or the limiting piece. In the present embodiment, as shown in FIG. 1, one end of the return spring 8.4 is connected to the first shaft rod 2 and the other end of the return spring 8.4 is connected to the limiting piece 8.3. The limiting piece 8.3 is a limiting rod, and the limiting rod is parallel to the first shaft rod 2.

Further, as shown in FIG. 1 and FIG. 2, the second shaft rod 4 is close to a front end of the bottom plate 1, and at least a part of the pedal 7 is located between the inclined rod 3 and a rear end of the bottom plate 1. In the present embodiment, the pedal 7 is located between the inclined rod 3 and the rear end of the bottom plate 1. In this way, it is convenient for a user to press the pedal downward by foot.

Further, as shown in FIG. 1 and FIG. 2, the limiting plate 5 is V-shaped, and the inclined rod 3 is located above the limiting plate 5.

Further, as shown in FIG. 1 and FIG. 2, the upper surface of the bottom plate is provided with a vertical plate 11, and in the present embodiment, there are two vertical plates, and the two vertical plates are parallel to each other. The first shaft rod is arranged on the vertical plate, and the inclined rod is located between the two vertical plates. The second shaft rod is also arranged on the vertical plate. In this way, it is convenient for the actual installation of the inclined rod and the actual installation of the limiting plate.

The above descriptions are only preferred embodiments of the present invention, and are not intended to be any limitation on the present invention. Any simple modification, alteration and equivalent transformation made to the above embodiments in accordance with the technical essence of the present invention will still fall within the protection scope of the technical solution of the present invention.

What is claimed is:

1. A scooter folding mechanism, comprising a bottom plate and an inclined rod for installing a vertical rod, wherein the inclined rod is rotatably arranged on the bottom plate through a first shaft rod, and the scooter folding mechanism further comprising: a limiting mechanism, a double-lock catch, a limiting plate rotatably arranged on the bottom plate through a second shaft rod, and a pedal rotatably arranged on the limiting plate through a third shaft rod;

the limiting mechanism comprises an unfolding clamping slot and a folding clamping slot that are arranged on the inclined rod, a limiting piece and a return spring that are arranged on the limiting plate and are configured to be matched with the unfolding clamping slot or the folding clamping slot, the return spring is configured to drive the limiting piece to be engaged with the unfolding clamping slot or the folding clamping slot, the unfolding clamping slot and the folding clamping slot are distributed circumferentially around the first shaft rod;

the double-lock catch comprises a double-lock block rotatably arranged on the inclined rod and a double-clamping groove arranged on the pedal and configured to be matched with the double-lock block.

2. The scooter folding mechanism of claim 1, wherein when the limiting piece is engaged with the unfolding clamping slot, the inclined rod and the bottom plate are in an unfolded state; when the limiting piece is engaged with the folding clamping slot, the inclined rod and the bottom plate are in a folded state; after the limiting piece is engaged with the unfolding clamping slot, the pedal is rotated around the third shaft rod toward the inclined rod, so that the double-lock block is engaged with the double-clamping groove.

3. The scooter folding mechanism of claim 2, wherein the limiting plate is provided with a jacking mechanism; the jacking mechanism comprises an installation hole arranged on the limiting plate, an ejector rod slidably arranged in the installation hole and a compression spring arranged on the installation hole; and the compression spring is located between a bottom surface of the installation hole and the ejector rod, such that an end portion of the ejector rod abuts against the pedal.

4. The scooter folding mechanism of claim 3, wherein after the double-lock block is engaged with the double-clamping groove, the end portion of the ejector rod abuts against the pedal under an action of the compression spring, such that the pedal abuts against the inclined rod.

5. The scooter folding mechanism of claim 2, wherein the pedal is provided with a limiting protruding block for matching with the limiting plate; and when the limiting protruding block abuts against the limiting plate, the limiting protruding block is configured to prevent the pedal from rotating downward around the third shaft rod.

6. The scooter folding mechanism of claim 2, wherein one end of the return spring is connected to the inclined rod or the first shaft rod, and the other end of the return spring is connected to the limiting plate or the limiting piece.

7. The scooter folding mechanism of claim 2, wherein the second shaft rod is close to a front end of the bottom plate, and at least a part of the pedal is located between the inclined rod and a rear end of the bottom plate.

8. The scooter folding mechanism of claim 7, wherein the limiting plate is V-shaped, and the inclined rod is located above the limiting plate.

9. The scooter folding mechanism of claim 2, wherein the limiting piece is a limiting rod, and the limiting rod is parallel to the first shaft rod.

10. The scooter folding mechanism of claim 2, wherein an upper surface of the bottom plate is provided with a vertical plate, and the first shaft rod is arranged on the vertical plate.

11. The scooter folding mechanism of claim 1, wherein the limiting plate is provided with a jacking mechanism; the jacking mechanism comprises an installation hole arranged on the limiting plate, an ejector rod slidably arranged in the installation hole and a compression spring arranged on the installation hole; and the compression spring is located between a bottom surface of the installation hole and the ejector rod, such that an end portion of the ejector rod abuts against the pedal.

12. The scooter folding mechanism of claim 11, wherein after the double-lock block is engaged with the double-clamping groove, the end portion of the ejector rod abuts against the pedal under an action of the compression spring, such that the pedal abuts against the inclined rod.

13. The scooter folding mechanism of claim 1, wherein the pedal is provided with a limiting protruding block for matching with the limiting plate; and when the limiting protruding block abuts against the limiting plate, the limiting protruding block is configured to prevent the pedal from rotating downward around the third shaft rod.

14. The scooter folding mechanism of claim 1, wherein one end of the return spring is connected to the inclined rod or the first shaft rod, and the other end of the return spring is connected to the limiting plate or the limiting piece.

15. The scooter folding mechanism of claim 1, wherein the second shaft rod is close to a front end of the bottom plate, and at least a part of the pedal is located between the inclined rod and a rear end of the bottom plate.

16. The scooter folding mechanism of claim 15, wherein the limiting plate is V-shaped, and the inclined rod is located above the limiting plate.

17. The scooter folding mechanism of claim 1, wherein the limiting piece is a limiting rod, and the limiting rod is parallel to the first shaft rod.

18. The scooter folding mechanism of claim 1, wherein an upper surface of the bottom plate is provided with a vertical plate, and the first shaft rod is arranged on the vertical plate.

* * * * *